United States Patent
Yasrebi et al.

(10) Patent No.: US 8,050,395 B2
(45) Date of Patent: Nov. 1, 2011

(54) ANALOG TELEPHONE ADAPTER AND EMERGENCY PROXY

(75) Inventors: Mehrad Yasrebi, Austin, TX (US);
Haifeng Bi, San Antonio, TX (US); Saji Varughese, Austin, TX (US); Satish Jaganath Parolkar, Austin, TX (US); Robert F. Dailey, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1293 days.

(21) Appl. No.: 11/451,202

(22) Filed: Jun. 12, 2006

(65) Prior Publication Data
US 2007/0286352 A1 Dec. 13, 2007

(51) Int. Cl.
*H04M 7/00* (2006.01)
*H04M 11/04* (2006.01)
*H04M 1/00* (2006.01)
*H04M 3/00* (2006.01)

(52) U.S. Cl. ........... 379/221.03; 379/37; 379/355.03; 379/355.09; 379/355.1; 379/357.03

(58) Field of Classification Search ........... 379/221.03, 379/37, 45, 361, 357.03, 355.04, 355.1, 355.09, 379/355.03, 355.02; 370/352, 356
See application file for complete search history.

(56) References Cited

U.S. PATENT DOCUMENTS

| | | | |
|---|---|---|---|
| 6,741,848 B2 | 5/2004 | Timonen et al. | |
| 6,775,534 B2 | 8/2004 | Lindgren et al. | |
| 6,807,409 B1 | 10/2004 | Davidson et al. | |
| 7,352,847 B2 * | 4/2008 | Goldman et al. | 379/45 |
| 2002/0163906 A1 | 11/2002 | Diachina et al. | |
| 2003/0227540 A1 | 12/2003 | Monroe | |
| 2004/0001572 A1 | 1/2004 | Chin et al. | |
| 2004/0190522 A1 | 9/2004 | Aerrabotu et al. | |
| 2004/0192252 A1 | 9/2004 | Aerrabotu et al. | |
| 2005/0083911 A1 | 4/2005 | Grabelsky et al. | |
| 2005/0144236 A1 | 6/2005 | Ying et al. | |
| 2005/0150464 A1 | 7/2005 | Schumacher et al. | |
| 2005/0201529 A1 | 9/2005 | Nelson et al. | |
| 2006/0007915 A1 | 1/2006 | Frame | |
| 2006/0039539 A1 | 2/2006 | Goldman et al. | |
| 2006/0050682 A1 | 3/2006 | Vance | |
| 2006/0072549 A1 * | 4/2006 | Goldman et al. | 370/352 |
| 2007/0269024 A1 * | 11/2007 | Dalrymple et al. | 379/37 |
| 2007/0274299 A1 * | 11/2007 | Ruckart | 370/356 |

FOREIGN PATENT DOCUMENTS

| | | |
|---|---|---|
| EP | 1 229 745 A2 | 8/2002 |
| WO | 2006/039783 A1 | 4/2006 |

OTHER PUBLICATIONS

International Search Report for International Patent No. PCT/US2007/011286, mailed Feb. 15, 2008.
Written Opinion of the International Searching Authority for PCT/US2007/011286, mailed on Feb. 15, 2008.

* cited by examiner

*Primary Examiner* — Thjuan K Addy
(74) *Attorney, Agent, or Firm* — Toler Law Group

(57) ABSTRACT

An analog telephone adapter (ATA) comprises a dial tone generator, control logic and a packet generator. The dial tone generator generates a dial tone when the ATA is in an unregistered state. The control logic processes a dial-out request when the ATA is in the unregistered state. The control logic directs the packet generator to generate an invite packet for an emergency proxy to handle the dial-out request on behalf of the ATA when the ATA is in the unregistered state.

22 Claims, 3 Drawing Sheets

ANALOG TELEPHONE ADAPTER AND EMERGENCY PROXY

FIELD OF THE DISCLOSURE

The present disclosure is generally related to packet telephone networks that register customer premises equipment.

BACKGROUND

Some telephone networks, such as those that use data packets to make calls and provide voice communications, require registration by customer premises equipment (CPE) before the CPE is allowed to make phone calls. The registration process comprises the CPE sending a register message to a network registration computer (known as a registrar) of a target network. The registration process further comprises configuring the CPE, which comprises receiving network registration data from the registrar and storing the network registration data in the CPE. The CPE, after being configured, initialized and registered, is allowed to make outgoing phone calls.

The CPE may be re-initialized or reconfigured at times, such as when its software is to be updated, after a first successful configuration and operation. Initialization and reconfiguration can be performed either manually or though a network-based download protocol.

The registrar determines whether or not to enable a CPE to make a phone call based on its network registration data stored by the CPE. If the registration data is valid, an acknowledge (ACK) message is sent to enable the CPE to make a phone call. If the registration data is invalid, the ACK message is not sent, thus prohibiting the CPE from making the phone call. If the registration data is invalid, a not-acknowledge (NACK) message may be sent.

If a configuration or reconfiguration process fails, a CPE may be temporarily prohibited from making phone calls.

DETAILED DESCRIPTION OF THE DRAWINGS

Disclosed herein are embodiments that enable an analog telephone adapter (ATA) to make one or more outgoing calls to one or more particular phone numbers even if the ATA is not in a successfully-registered state or cannot otherwise make outgoing calls to other phone numbers. The ATA internally generates and outputs a dial tone when not in the successfully-registered state. The internally-generated dial tone, off-hook facility is used to indicate to a user or an external device that the user or the device can dial a phone number to make an outgoing call. If the phone number is one of the particular phone numbers, and/or if the ATA otherwise allows a call attempt on any of its user/device external device port(s), the ATA generates and sends an invite emergency packet to an emergency proxy. The emergency proxy provides a network-provider-based service for sending emergency messages. The emergency proxy is registered in a packet network to represent the ATA to the packet network and to be a next destination for the ATA. After receiving the invite emergency packet, the emergency proxy places the call to the phone number on behalf of the ATA. Examples of the one or more particular numbers include, but are not limited to, one or more emergency telephone numbers such as "911", "311" or a security monitoring station. It is noted that the ATA may allow all dialed numbers to be presented to the network, and the list of allowed destination numbers may be embedded in a network proxy which decides whether the dialed numbers should be contacted even if the ATA is not registered in the network.

Optionally, if an error condition occurs in response to the ATA being initialized or re-configured, or for another particular condition, the ATA is enabled to send system diagnosis data that can be used to correct the error condition, even if the ATA cannot make calls to the other phone numbers.

Figure 1:
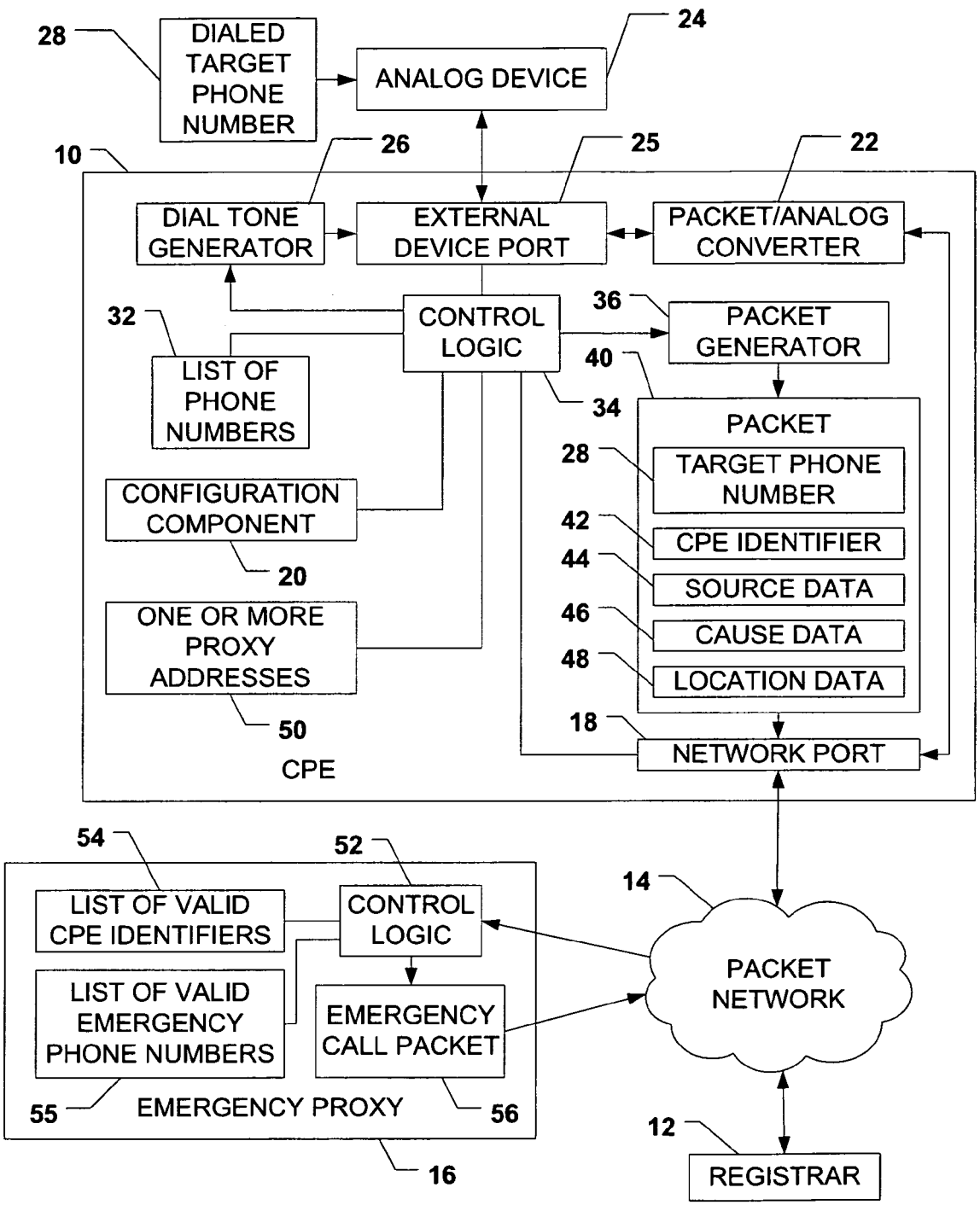
FIG. 1 is a block diagram of an embodiment of a system for sending an emergency message using an emergency proxy if a customer premise equipment is otherwise prohibited from making phone calls.

Referring to FIG. 1, an embodiment of a system comprises a CPE 10, a registrar 12, a packet network 14 and an emergency proxy 16. The CPE 10 comprises a network port 18 to communicate data packets with the packet network 14. The CPE 10 further comprises a configuration component 20 that cooperates with the registrar 12 to initialize, configure and register the CPE 10. The CPE 10 communicates with the registrar 12 via the packet network 14.

If the CPE 10 is successfully registered with the registrar 12, the CPE 10 is considered to be in a successfully-registered state. According to established protocol rules, when in the successfully-registered state, the CPE 10 is permitted to make phone calls via the packet network 14. The packet network 14 may use an Internet Protocol (IP) Multimedia Subsystem (IMS) network that uses registrations to permit CPEs to make phone calls. The phone calls may comprise Voice over Internet Protocol (VoIP) calls.

If the CPE 10 has not registered with the registrar 12 or has unsuccessfully attempted to register with the registrar 12, the CPE 10 is considered to be in an unregistered state. The CPE 10 may be in the unregistered state because of an error occurring during either a configuration process, a reconfiguration process or because the network rejected the registration attempt. An error in the reconfiguration process may cause the CPE 10, which had been successfully-registered, to become unregistered. When in the unregistered state, the CPE 10 is limited in which phone calls can be made via the packet network 14. For example, when in the unregistered state, the CPE 10 may be unable to make any phone calls via the packet network 14 without the assistance of the emergency proxy 16.

The CPE 10 may comprise a telecommunication device that natively supports voice/data packets and comprises one or more of the herein-described features. Alternatively, the CPE 10 may comprise an add-on protocol packetized adapter, for use with a legacy telecommunication device such as a telephone, which provides one or more of the herein-described features.

In some embodiments, the CPE 10 may comprise an analog telephone adapter (ATA). In these and other embodiments, the CPE 10 may comprise a converter 22 to converts analog signals from an analog device 24 to packets and vice-versa. The analog device 24 may comprise an analog telephone or a security system component, for example. The CPE 10 comprises an external device port 25 to which the analog device 24 is connected.

The CPE 10 comprises a dial tone generator/off-hook indicator 26 to internally generate a dial tone and indicate simulated network availability (e.g. by electrically generating an off-hook signal) when the CPE 10 is in the unregistered state. The dial tone/simulated network availability is outputted via the external device port 25 to the analog device 24. The dial tone/simulated network availability may be presented to a user/device on the port 25 before the user/device attempts to make an outgoing phone call via the CPE 10 when the CPE 10 is in the unregistered state. Further, the dial tone/simulated network availability may serve to keep the analog device 24 active (e.g. to keep a security system active) when the CPE 10 is in the unregistered state.

After receiving the dial tone/simulated indication of network availability, either a user or a device can dial a target phone number 28 to make a dial-out request via the CPE 10 when the CPE 10 is in the unregistered state. The CPE 10 may locally store a list of phone numbers 32 that are permitted to be called when the CPE 10 is in the unregistered state. The list of phone numbers 32 may comprise emergency phone numbers such as "911", "311" and a number of a security monitoring station, for example. In general, the list of phone numbers 32 may include one or more government-mandated phone numbers and/or one or more non-mandated phone numbers. Alternatively, such a list 55 may be stored in the emergency proxy 16. It is possible for both lists 32 and 55 to be non-empty, although network-based control may be preferred by a network provider.

The CPE 10 comprises control logic 34 to process the dial-out request based on a state of the CPE 10, e.g. whether the CPE 10 is in the successfully-registered state or the unregistered state. The control logic 34 further processes the dial-out request based on whether or not the target phone number 28 matches any of the numbers in the list of phone numbers 32. As part of this disclosure for generating emergency messages, a novel scheme is devised where the list may be used when the CPE 10 is in the unregistered state. However, such a list may also be consulted when the CPE 10 is in the registered state to implement a CPE-based dial-out restriction.

If the target phone number 28 matches one of the numbers in the list of phone numbers 32 and the CPE 10 is in the unregistered state (or otherwise cannot make an outgoing call without the assistance of the emergency proxy 16), the control logic 34 directs a packet generator 36 to generate a packet 40. The packet 40, which may be referred to as an invite emergency packet, is specific for dial-out requests when the CPE 10 is in the unregistered state. The packet 40 is formed in accordance with a protocol defined between the CPE 10 and a service provided by the emergency proxy 16. The form of the packet 40 differs from an invite message packet used for dial-out requests when the CPE 10 is in the successfully-registered state. The form of the packet 40 may be proprietary between the CPE 10 and the emergency proxy 16 without adversely affecting the operation of the CPE 10 and the emergency proxy 16.

The packet 40 contains the target phone number 28 and other regular contents that would specify a dial-out request when the CPE 10 is successfully-registered. The packet 40 further comprises an identifier 42 of the CPE 10 and optionally additional data. The identifier 42 can be used to identify a premise where the CPE 10 is located. The additional data may comprise data 44 indicating a source of the dial-out request, data 46 indicating a cause of the dial-out request, and location data 48 indicating a location of the CPE 10. The data 44 may indicate if an automated device such as a security system is the source, or if a live user is attempting to place a call without an active voice session. The data 46 may identify an emergency situation such as fire, flood, bodily injury or intruder, for example. The location data 48 may comprise a street address or global positioning system (GPS) data indicating the location of the CPE 10. The location data 48 may be configured in the CPE 10. In general, the additional data may comprise any data that is uniquely configured for the CPE 10.

Configured in the CPE 10 is a list of one or more addresses 50 of one or more proxies, including the emergency proxy 16, to which the packet 40 can be sent. The CPE 10 sends the packet 40 to the emergency proxy 16 based on the one or more addresses 50. The CPE 10 may send the packet 40 to more that one emergency proxy for purposes of redundancy. For example, if the CPE 10 is unable to successfully communicate the packet 40 to a first emergency proxy in the list (e.g. if the first emergency proxy is unreachable or is unavailable), the CPE 10 may attempt to communicate the packet 40 to a next emergency proxy in the list. Attempts to communicate the packet 40 to subsequent emergency proxies in the list may continue until one of the emergency proxies successfully receives the packet 40 and is available to process the packet 40.

Consider the CPE 10 sending the packet 40 to the emergency proxy 16, and the emergency proxy 16 successfully receiving the packet 40. The emergency proxy 16 is always registered at the registrar 12 regardless of whether or not the CPE 10 is registered. Thus, the emergency proxy 16 is permitted to make phone calls even if the CPE 10 is unregistered. Emergency proxies are network-based components that are both internally redundant (where each component is internally redundant) and externally redundant (by use of multiple network-based components).

The emergency proxy 16 comprises control logic 52 to process the packet 40. The control logic 52 matches the identifier 42 in the packet 40 to a list 54 of valid CPE identifiers and their locations. The control logic 52 determines if the target phone number 28 in the packet 40 is included in a list 55 of valid emergency phone numbers for the particular identifier 42. The list 55 of valid emergency phone numbers may comprise security monitoring station phone number(s), "911", "311" and/or other well-known emergency phone numbers. Different CPE identifiers may have different valid emergency phone numbers in their list. For example, a first CPE identifier may have a first security monitoring station phone number, and a second CPE identifier may have a second security monitoring station phone number that differs from the first security monitoring station phone number. Optionally, each of a plurality of different monitored environments (e.g. different houses) can have its own unique target monitoring station phone number.

If the target phone number 28 is included in the list 55, the emergency proxy 16 generates and sends an emergency call packet 56 on behalf of the CPE 10. The emergency call packet 56 causes a call to be made between the emergency proxy 16 (on behalf of the CPE 10) and a callee at to the target phone number 28.

The emergency call packet 56 can contain digitized information as may be needed by and/or acceptable to the callee. Different digitized information can be used for different emergency situations (e.g. fire, flood, bodily injury or intruder). Many different formats may be supported by the emergency proxy 16 as may be needed by and/or acceptable to the callee. The emergency call packet 56 may include content that carries some, most or all of the data supplied in the packet 40.

If the target phone number 28 is not included in the list 55, the emergency proxy 16 does not attempt to make a call to the target phone number 28. In this case, the emergency proxy 16 may record that an unacceptable unregistered call attempt (e.g. an unexpected or wrong call attempt) has been received. The emergency proxy 16 can track how many unexpected or wrong call attempts have been made by the CPE 10. The emergency proxy 16 may automatically notify a party, such as a network administrator, if the number of unexpected or wrong call attempts for any CPE is greater than or equal to a threshold.

The emergency proxy 16 can be located at the customer premise as part of equipment shipped to a customer. Alternatively, the emergency proxy 16 can be a network-based device located remotely from the customer premise. Embodying the emergency proxy 16 as a network-based device is expected to be less susceptible to configuration errors than for a CPE-based device, and may be more manageable and secure. The emergency proxy 16 can be a modification or enhancement of an existing network element, such as a session border controller. Alternatively, the emergency proxy 16 can be an additional network element.

Figure 2:
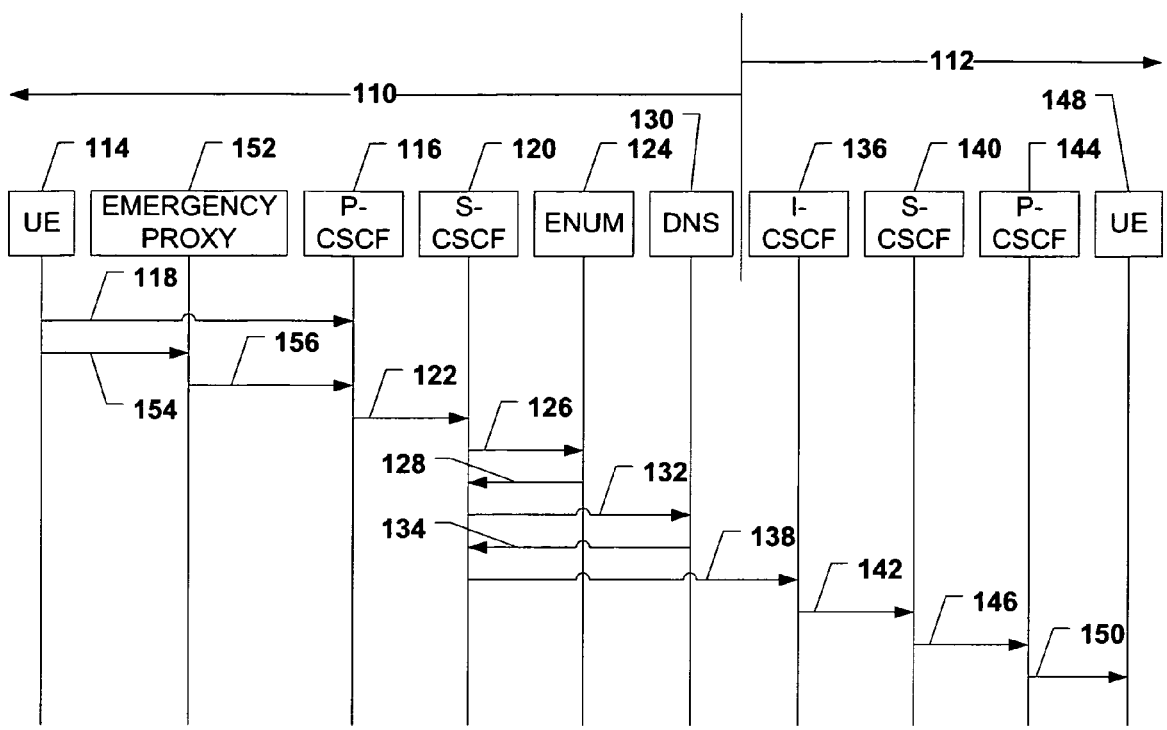
FIG. 2 is a flow diagram of an embodiment of the customer premise equipment and the emergency proxy being used to place a Voice over Internet Protocol.

FIG. 2 is a flow diagram of an embodiment of the herein-disclosed CPE and emergency proxy being used to place calls using Voice over Internet Protocol (VoIP) in an IMS network. The flow is applicable to security monitoring station calls and some or all user-dialed calls. It is noted that actual handing of a "911" call may differ from the flow in FIG. 2.

Consider a call that is attempted between a caller at a network 110 and a callee at another network 112. User equipment 114 comprises an embodiment of the herein-disclosed CPE such as an ATA. When in the successfully-registered state, the user equipment 114 outputs a dial tone to either a caller or a device when in the successfully-registered state. When in the unregistered state, the user equipment 114 internally simulates an available network interface (e.g. generates and outputs a dial tone) to either the caller or the device. After being presented with the dial tone or the indication of network simulated availability, either the caller or the device dials an E.164 number of a callee.

If the user equipment 114 is in the successfully-registered state, the E.164 number is passed from the user equipment 114 to a Proxy Call Session Control Function (P-CSCF) 116 of the network 110 (as indicated by arrow 118). Based on the E.164 number, the P-CSCF 116 sends an invite message and passes it to a Serving-CSCF (S-CSCF) 120 of the network 110 (as indicated by arrow 122). The S-CSCF 120 queries a telephone number mapping (ENUM) database 124 of the network 110 to attempt to resolve the E.164 number to a Uniform Resource Indicator (URI) (as indicated by arrow 126).

The ENUM database 124 returns a Session Initiation Protocol (SIP) URI or a telephone (TEL) URI to the S-CSCF 120 based on the query (as indicated by arrow 128). Based on the SIP/TEL URI, the S-CSCF 120 queries a Domain Name System (DNS) 130 of the network 110 to resolve a domain name of the URI to an Internet Protocol (IP) address (as indicated by arrow 132). The DNS 130 returns the IP address of the URI domain to the S-CSCF 120 (as indicated by arrow 134). The IP address is for an Interrogating-CSCF (I-CSCF) 136 of the network 112.

Using the IP address, the S-CSCF 120 of the network 110 sends a SIP INVITE request to the I-CSCF 136 of the network 112 (as indicated by arrow 138). The I-CSCF 136 locates an S-CSCF 140 of the network 112, and sends the SIP INVITE request to the S-CSCF 140 (as indicated by arrow 142). The S-CSCF 130 passes the SIP invite request to a P-CSCF 144 of the network 112 (as indicated by arrow 146). The P-CSCF 144 passes the SIP INVITE request to user equipment 148 of the callee (as indicated by arrow 150).

If the user equipment 114 is in the unregistered state, the E.164 number is passed from the user equipment 114 to an emergency proxy 152 in an invite emergency packet (as indicated by arrow 154). Upon determining that the E.164 number is an authorized emergency number, the emergency proxy 152 passes the E.164 number to the P-CSCF 116 of the network 110 (as indicated by arrow 156). Thereafter, the aforementioned acts indicated by the arrows 122, 126, 128, 132, 134, 138, 142, 146 and 150 are performed to complete the call.

Embodiments of the CPE and the emergency proxy can be used for network-based assistance for configurations of CPEs that are unavailable to dial out. In this case, the target dialed number may be that of a computer for a network administrator. The packet transmitted from the CPE to the emergency proxy may contain configuration data for the CPE. The network administrator can use the configuration data to correct an issue with the CPE and/or to assist a user who is attempting to use the CPE to dial out. Further, a network troubleshooting protocol exchange may be entirely digital and use proprietary protocols, based on the contents of the invite emergency packet, between the emergency proxy 152 and other network management components (not shown) used for network troubleshooting. The invite emergency packet from the CPE may be used for troubleshooting without resulting in a voice call.

Embodiments of the CPE and the emergency proxy can also be used for automatic detection of telephone numbers for a target monitoring station. The emergency proxy can be programmed to examine the content of an emergency alarm packet received from the CPE to deduce that a call is an emergency alarm call. If an emergency call is deduced, the emergency proxy can make a call on behalf of the CPE even if a telephone number of its monitoring station has not been configured in the emergency proxy.

Figure 3:
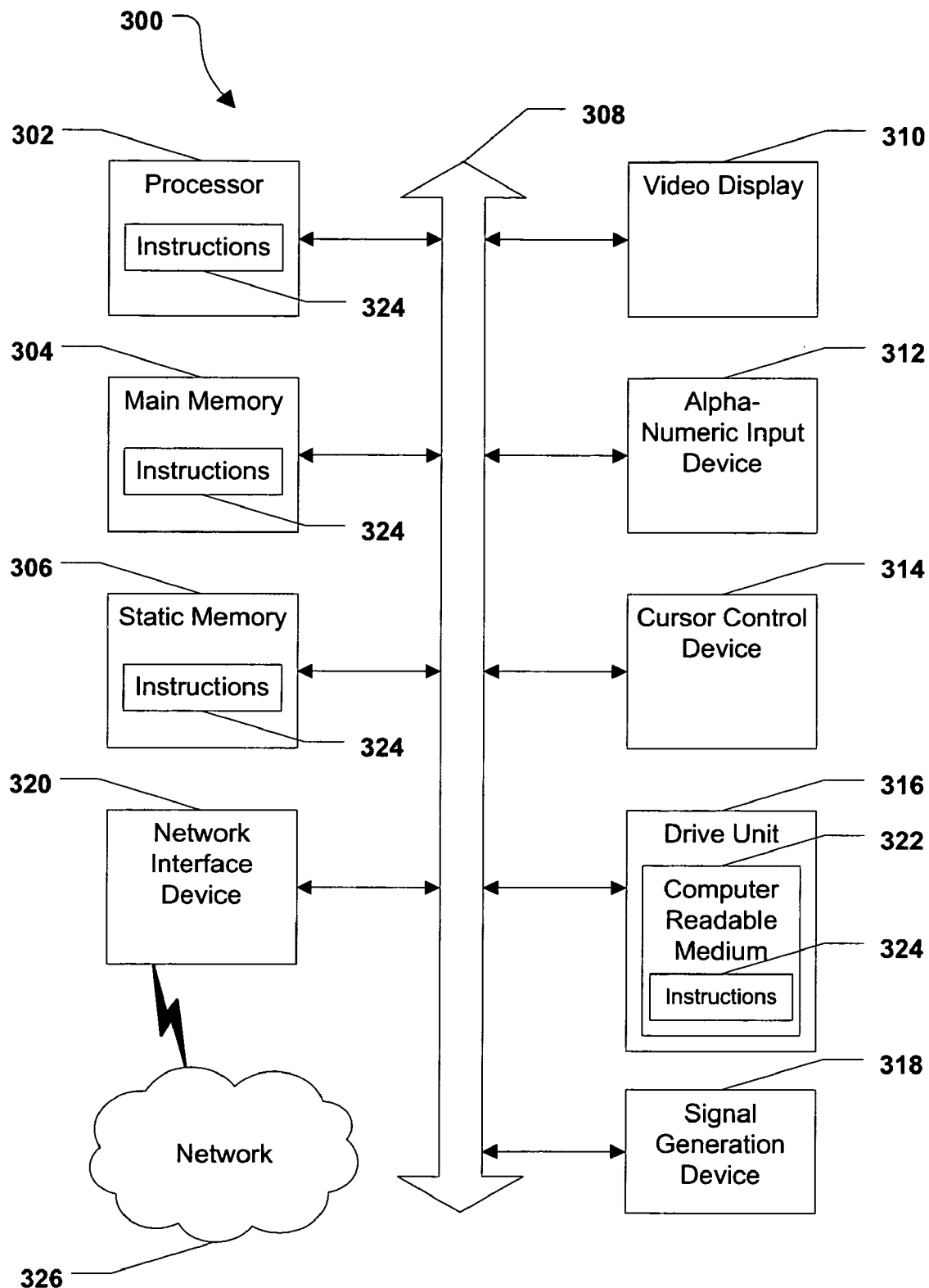
FIG. 3 is a block diagram of an illustrative embodiment of a general computer system.

Referring to FIG. 3, an illustrative embodiment of a general computer system is shown and is designated 300. The computer system 300 can include a set of instructions that can be executed to cause the computer system 300 to perform any one or more of the methods or computer based functions disclosed herein. The computer system 300 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 300 can be implemented using electronic devices that provide voice, video or data communication. Further, while a single computer system 300 is illustrated, the term "system" shall also be taken to include any collection of systems or sub-systems that individually or jointly execute a set, or multiple sets, of instructions to perform one or more computer functions.

As illustrated in FIG. 3, the computer system 300 may include a processor 302, e.g., a central processing unit (CPU), a graphics processing unit (GPU), or both. Moreover, the computer system 300 can include a main memory 304 and a static memory 306, that can communicate with each other via a bus 308. As shown, the computer system 300 may further include a video display unit 310, such as a liquid crystal display (LCD), an organic light emitting diode (OLED), a flat panel display, a solid state display, or a cathode ray tube (CRT). Additionally, the computer system 300 may include an input device 312, such as a keyboard, and a cursor control device 314, such as a mouse. The computer system 300 can also include a disk drive unit 316, a signal generation device 318, such as a speaker or an audio tone generator, and optionally zero or more network interface devices 320.

In a particular embodiment, as depicted in FIG. 3, the disk drive unit 316 may include a computer-readable medium 322 in which one or more sets of instructions 324, e.g. software, can be embedded. Further, the instructions 324 may embody one or more of the methods or logic as described herein. In a particular embodiment, the instructions 324 may reside completely, or at least partially, within the main memory 304, the static memory 306, and/or within the processor 302 during execution by the computer system 300. The main memory 304 and the processor 302 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 324 or receives and executes instructions 324 responsive to a propagated signal, so that a device connected to a network 326 can communicate voice, video or data over the network 326. Further, the instructions 324 may be transmitted or received over the network 326 via the network interface device 320.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
an analog telephone adapter (ATA) which comprises a dial tone generator, control logic, a memory, and a packet generator, the dial tone generator to generate a dial tone when the ATA is in an unregistered state, the control logic to process a dial-out request to a target phone number made by an external device when the ATA is in the unregistered state, the control logic to direct the packet generator to generate an invite packet for an emergency proxy to handle the dial-out request on behalf of the ATA when the ATA is in the unregistered state, wherein the invite packet encodes location data and cause data, wherein the cause data indicates one of a plurality of emergency situations, wherein the memory stores a list of phone numbers that are permitted to be called when the ATA is in the unregistered state, and wherein the control logic directs the packet generator to generate the invite packet upon determining that the target phone number is included in the list of phone numbers.

2. The system of claim 1, wherein the memory stores a proxy list of a plurality of addresses associated with a plurality of emergency proxies.

3. The system of claim 2, wherein the ATA attempts to communicate the invite packet to a first emergency proxy in the proxy list, and if the first emergency proxy is unreachable or unavailable, the ATA attempts to communicate the invite packet to a second emergency proxy in the proxy list.

4. The system of claim 1, wherein the invite packet encodes the target phone number and an identifier of the ATA.

5. The system of claim 4, wherein the invite packet further encodes data indicating a source of the dial-out request.

6. The system of claim 1, further comprising the emergency proxy which receives the invite packet.

7. The system of claim 6, wherein the emergency proxy generates and sends an emergency call packet on behalf of the ATA based on the invite packet.

8. The system of claim 6, wherein the emergency proxy records a number of unacceptable call attempts made using the ATA when the ATA is in the unregistered state.

9. The system of claim 8, wherein the emergency proxy notifies a party if the number of unacceptable call attempts is greater than or equal to a threshold.

10. The system of claim 1, wherein the external device comprises a security system component.

11. A method comprising:
internally generating a dial tone by an analog telephone adapter (ATA) when the ATA is in an unregistered state;
processing a dial-out request made by an external device to the ATA when the ATA is in the unregistered state, wherein the dial-out request is to a target phone number;
determining that the target phone number is included in a list of phone numbers stored by the ATA; and
generating, by the ATA responsive to determining that the target phone number is included in the list, an invite packet for an emergency proxy to handle the dial-out request on behalf of the ATA when the ATA is in the unregistered state, wherein the invite packet encodes location data and cause data, wherein the cause data indicates one of a plurality of emergency situations.

12. The method of claim 11, further comprising:
attempting to communicate the invite packet from the ATA to a first emergency proxy; and
if the first emergency proxy is unreachable or unavailable, attempting to communicate the invite packet from the ATA to a second emergency proxy.

13. The method of claim 11, wherein the invite packet encodes the target phone number and an identifier of the ATA.

14. The method of claim 13, wherein the invite packet further encodes data indicating a source of the dial-out request.

15. The method of claim 11, further comprising:
receiving the invite packet by the emergency proxy.

16. The method of claim 15, further comprising:
generating and sending, by the emergency proxy, an emergency call packet on behalf of the ATA based on the invite packet.

17. The method of claim 16, wherein said sending the emergency call packet is performed upon determining that the target phone number is included in a list of phone numbers stored by the emergency proxy.

18. The method of claim 15, further comprising:
recording, by the emergency proxy, a number of unacceptable call attempts made using the ATA when the ATA is in the unregistered state.

19. The method of claim 18, further comprising:
notifying a party if the number of unacceptable call attempts is greater than or equal to a threshold.

20. The method of claim 15, wherein the emergency proxy is registered in a packet network to represent the ATA to the packet network.

21. A non-transitory computer-readable medium having computer program code to cause an analog telephone adapter (ATA) to:
internally generate a dial tone when the ATA is in an unregistered state;
process a dial-out request made by an external device to the ATA when the ATA is in the unregistered state, wherein the dial-out request is to a target phone number;
determine that the target phone number is included in a list of phone numbers stored by the ATA; and
generate, by the ATA responsive to determining that the target phone number is included in the list, an invite packet for an emergency proxy to handle the dial-out request on behalf of the ATA when the ATA is in the unregistered state, wherein the invite packet encodes location data and cause data, wherein the cause data indicates one of a plurality of emergency situations.

22. The system of claim 1, wherein the one of the plurality of emergency situations is associated with one of: a fire, a flood, an injury, and an intruder.

* * * * *